Sept. 20, 1932.  B. J. CONNOR  1,877,814
ROTARY ROD WEEDER
Filed Sept. 23, 1930  3 Sheets-Sheet 1
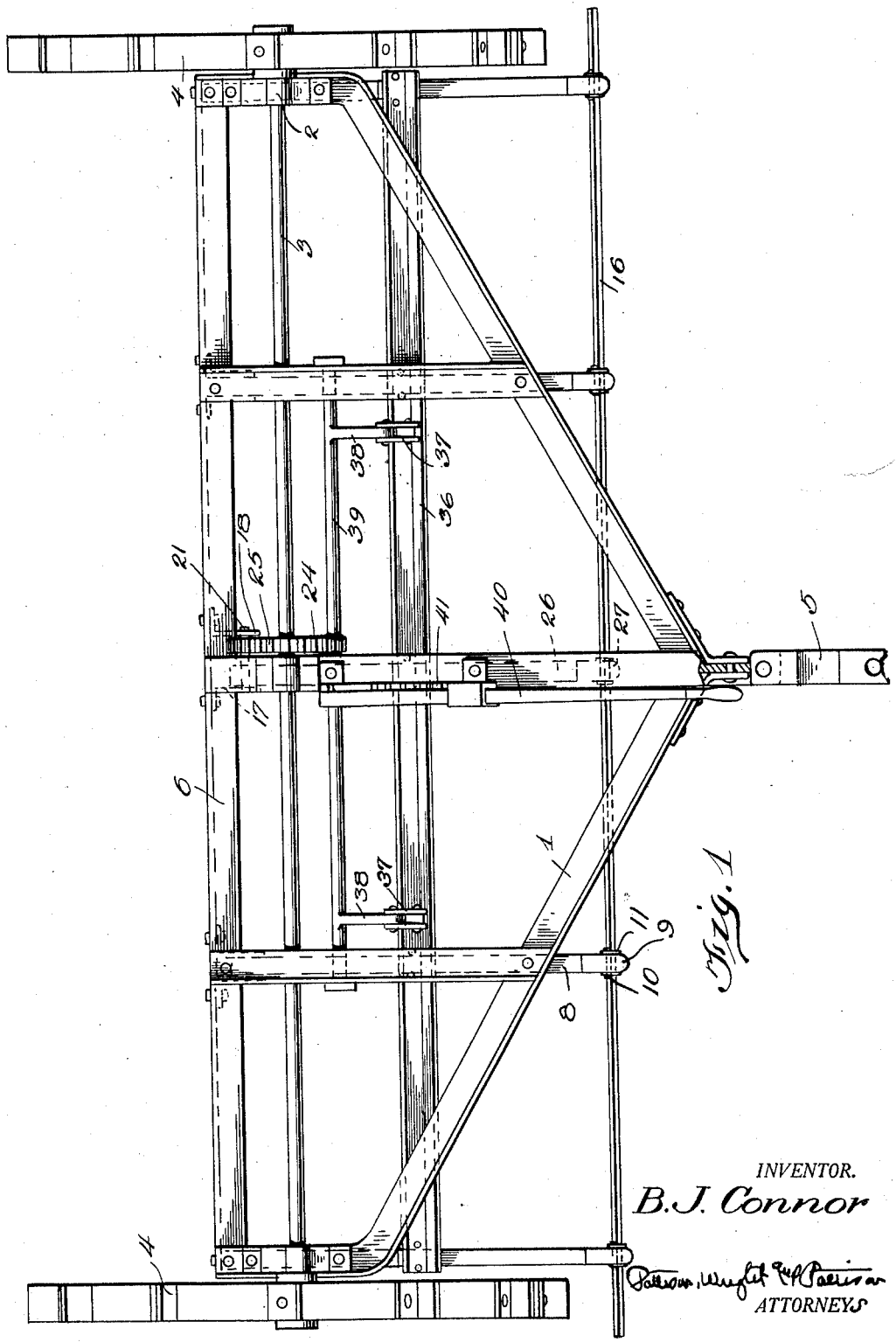
INVENTOR.
B. J. Connor
ATTORNEYS

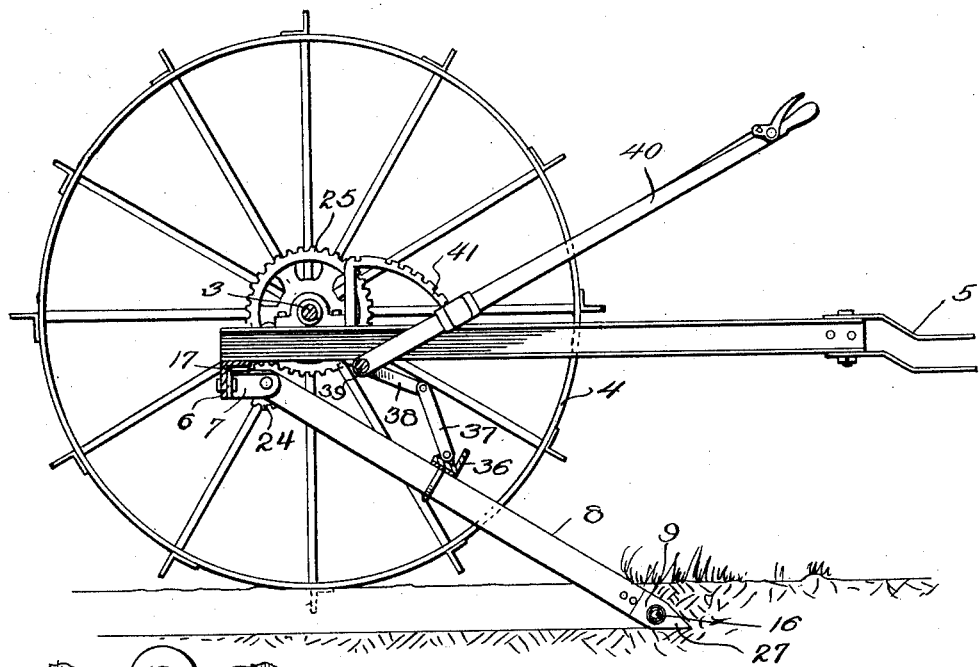
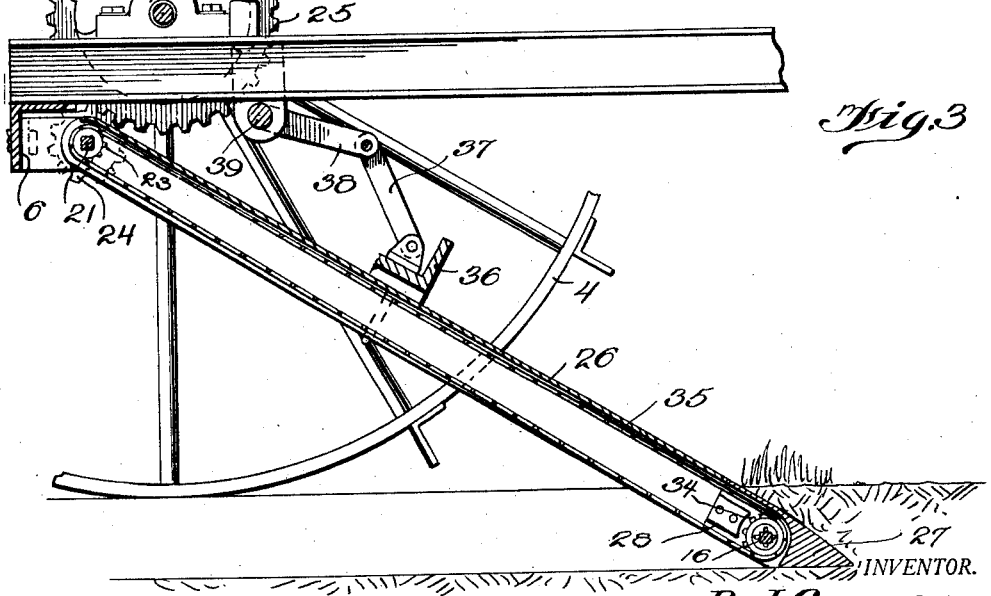

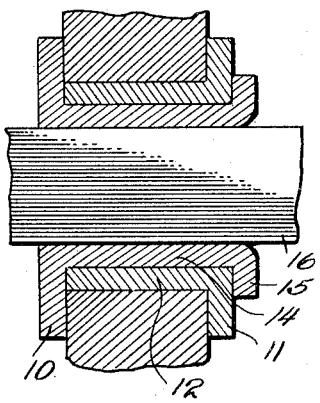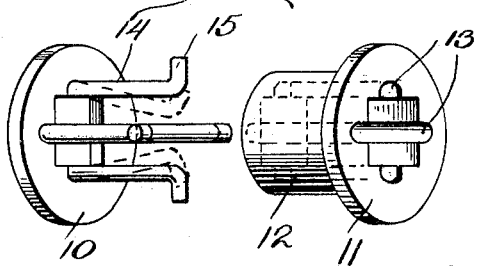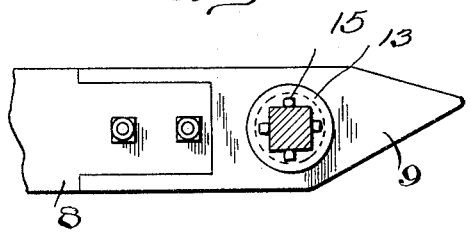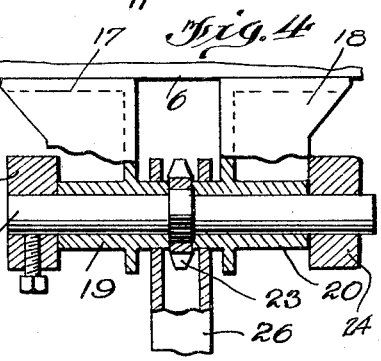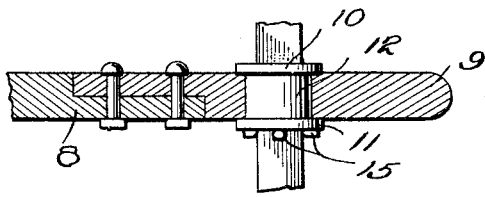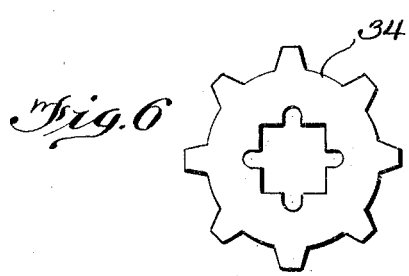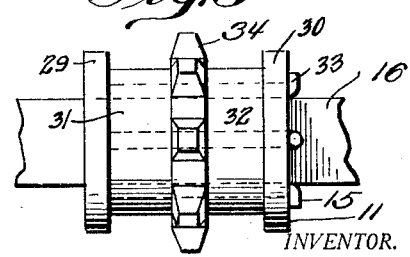

Patented Sept. 20, 1932

1,877,814

UNITED STATES PATENT OFFICE

BENJAMIN JEROME CONNOR, OF CHAPPELL, NEBRASKA

ROTARY ROD WEEDER

Application filed September 23, 1930. Serial No. 483,899.

This invention relates to certain new and useful improvements in rotary rod weeders, the object being to provide a weeder with a main frame carrying a plurality of forwardly projecting beams for supporting the weeder rod or cultivator, means being disposed centrally of the machine for driving said rod through one of the beams.

Another object of my invention is to provide a rotary rod weeder in which the beams can be adjusted independently of the main frame whereby they can be raised and lowered very easily.

Another object of my invention is to provide a novel form of ground bearing for the rod whereby these bearings can be easily and quickly placed in position or removed therefrom.

A still further object of the invention is to provide a rod weeder with a central hollow beam, the lower wall of which is cut away to allow any dirt which is caught by the drive chain to drop out of the beam as the chain moves upwardly.

A still further object of the invention is to provide a weeder with a series of rod carrying beams which are connected together and move as a unit, the upper ends of the beams being pivotally mounted in the frame in transverse alignment with the driven shaft.

Other and further objects and advantages of the invention will be hereinafter set forth and the novel features thereof defined by the appended claims.

In the drawings,

Figure 1 is a top plan view of a rotary rod weeder constructed in accordance with my invention;

Figure 2 is a longitudinal section through the same;

Figure 3 is a detail enlarged longitudinal section through the central beam showing the drive chain and manner of driving the weeder rod;

Figure 4 is a detail view of the bearings for the driven shaft;

Figure 5 is a detail view of the ground bearing for the central beam showing the manner of securing the sprocket wheel between the sections of the bearing on the rotary weeder rod;

Figure 6 is a detail view of the sprocket;

Figure 7 is a perspective view of one of the ground bearings showing the sections detached;

Figure 8 is a vertical section through the bearings showing the rod in position;

Figure 9 is a detail side elevation of one of the beams and the shoe carried thereby showing the rod in position; and Figure 10 is a section through the lower end of one of the shoes.

In the embodiment of my invention as herein shown, I employ a substantially V-shaped main frame 1 formed of angle irons and I beams, the ends of the frame being provided with bearings 2 in which is mounted an axle 3 provided with wheels 4 having a driving connection therewith so that as the wheel rotates, the axle will be rotated. The forward end of the frame is provided with a draw bar 5 forming a draft connection so that the same can be connected to a tractor or the like.

Secured to the rear bar 6 of the main frame are brackets 7 between which are mounted beams 8 provided with shoes 9 at their lower ends having transverse openings in which are mounted sectional spool ground bearings formed of sections 10 and 11, section 10 being in the form of a disc and the section 11 being in the form of a disc with a sleeve 12 formed integral therewith, and these sections are provided with rectangular openings, the walls of the openings of the section 11 being provided with oppositely disposed grooves 13 adapted to receive yieldable arms 14 carried by the section 10 having outwardly turned ends 15 which engage the outer faces of the section 11 when the two sections are forced together so as to hold these two sections within the opening of the shoe of the beam. When these sections are arranged in the opening of the beam and the weeder rod 16 is forced through one of these bearings, the arms 14 will be forced outwardly and held so that the two sections of the bearings will be securely locked within the shoe of the beam. It will be noted that I have provided four arms for locking the two sections together and that these arms are formed of rods. When the weeder rod 16 is removed, the ends of the rods can be forced inwardly so that these two sections can be separated in order to detach the same from the shoe.

Disposed centrally of the main frame and extending outwardly from the rear angle iron 6 thereof are bracket arms 17 and 18 provided with bearings 19 and 20 provided with suitable grease cups and in which is mounted a driven shaft 21 locked in position therein by collars 22, said shaft being provided with a square portion on which is mounted a sprocket wheel 23 having a square opening to receive the square portion of the driven shaft. The driven shaft 21 carries a gear wheel 24 at its outer end which meshes with a driving gear 25 fixed on the axle 3 so that as the machine is drawn over the ground, the driven shaft 21 will be rotated.

Pivotally mounted between the bracket arms 17 and 18 on bosses found on the arms is a hollow beam 26 which is preferably formed inverted U shape in cross section, the upper end of the beam being pivotally mounted over the sprocket wheel 23 so as to enclose the sprocket wheel and protect it from dirt as shown in Figure 4.

The lower end of the beam carries a hollow shoe 27 which is provided with a portion 28 extending into the hollow beam and through which transversely arranged bolts pass for connecting the shoe to the lower end of the beam. The shoe is provided with a transverse opening in which is arranged a sectional ground bearing for the weeder rod 16, said ground bearing being composed of a pair of discs 29 and 30 provided with sleeve portions 31 and 32 having rectangular bores to receive the rectangular weeder rod and the bores of these sleeves are provided with oppositely disposed grooves to receive yieldable rods 33 carried by the disc 29, the free ends of the rod being turned outwardly so that when these two sections are placed in position within the shoe 27 of the beam 26 and a rod is forced through the same, they will be locked within the shoe and when the rod is withdrawn, it is only necessary to force the yieldable rods inwardly in order to allow the sections to be separated in order to detach the same from the shoe of the beam.

Disposed on the rotary weeder rod 16 between the sleeves 31 and 32 is a sprocket wheel 34 which is provided with a rectangular opening corresponding in shape to the shape of the weeder rod so as to drive said rod, said opening being provided with oppositely disposed notches to receive the rods 33.

The outer faces of the shoe 27 around the transverse opening are provided with annular recesses to receive the discs 29 and 30 of the ground bearing when it is in its proper position within the shoe so that the side faces of the shoe are smooth, which prevents any projection being formed on the shoe so as to eliminate the catching of any trash or the like, which allows the shoe to be readily forced into the ground as the machine is drawn over the same.

Passing over the sprocket wheels 23 and 34 is a sprocket chain 35 which travels in the hollow beam 26 and through the driving connection of the axle the rotary weeder rod 16 will be rotated as the machine is drawn over the ground.

The beams 8 and 26 extend forwardly in advance of the wheels and are connected together by an angled iron 36, to which are connected links 37 carried by arms 38 of a rocker shaft 39 mounted within the main frame, said rocker shaft carrying a lever 40 which is fixed thereto so as to rock said shaft as said lever is moved, said lever being locked in its adjusted position by a pawl working over a detent 41 fixed to the main frame. This provides a construction of raising and lowering all the beams as a unit independent of the main frame so that the beams can be adjusted easily in order to adjust and hold the weeder rod in the ground at the proper depth as the machine is drawn over the surface.

From the foregoing description it will be seen that I have provided a rotary rod weeder composed of a main frame mounted on wheels and having a plurality of beams extending downwardly and forwardly therefrom which are pivotally mounted to the rear of the axle and are adjustable vertically independent of the main frame, one of the beams being hollow to receive the drive chain for rotating the weeder rod which is mounted in detachable ground bearings in the shoes of the beams, said chain being driven by a sprocket wheel mounted on a driven shaft which is in transverse alignment with the bearings of the beams.

In the operation of a rotary rod weeder as herein shown, assuming that the same is being drawn over the ground by a tractor or the like and that the beams have been adjusted so as to set the shoes with the weeder rod at the proper depth within the ground through the medium of the drive chain through the hollow central beam, the rod will be rotated as the machine is drawn over the ground so as to cultivate the ground and remove the weeds therefrom.

What I claim is:

1. In a rotary rod weeder, a weeder rod supporting shoe provided with a transverse opening, a sectional rod bearing mounted in said opening, movable means for locking the sections of said bearing together in said opening, said means being held in locked position by the insertion of said weeder rod.

2. In a rotary rod weeder, a shoe, a ground bearing for the rotary rod weeder comprising a sectional spool having an opening to receive the weeding rod, one of said sections being provided with a locking member held into locked position by the insertion of said weeder rod.

3. In a rotary rod weeder, a rod supporting beam having a shoe at its lower end provided with an opening, a sectional bearing mounted in said opening, and means held in locked position by the weeder rod for locking the sections of said bearing in the shoe of said beam.

4. A rotary rod weeder comprising a frame having an axle mounted therein carrying wheels, a driven shaft having a driving connection with said axle, forwardly projecting beams pivotally mounted on said frame in alignment with said driven shaft, one of said beams being inverted U-shaped in cross section said beams being provided with shoes at their free ends, a bar connecting said beams, weeder rods mounted in said shoes, a sprocket carried by said weeder rod in one of said shoes, a sprocket carried by said driven shaft and said beam, a sprocket chain passing over said sprockets and working within said U beam, and means for raising and lowering said beams as a unit independent of said frame.

5. A rotary rod weeder comprising a frame having an axle mounted therein, wheels having a driving connection with said axle, a driven shaft, a driving connection between said driven shaft and said axle, a plurality of beams pivotally mounted in said frame and a bar connecting said beams, said beams being provided with shoes, a weeder rod mounted in said shoes, means for rotating said rod from said driven shaft and means connected to said bar to each side of its center for raising and lowering said beams independent of said frame.

6. A rotary rod weeder comprising a main frame having an axle mounted therein, wheels mounted on said axle having a driving connection therewith, beams pivotally mounted in said frame and projecting forwardly therethrough, a bar connecting said beams, a weeder rod carried by the lower ends of said beams, a detent, a rocker shaft having a connection with said bar, and a lever fixed to said rocker shaft having a pawl cooperating with said detent.

7. In a rotary rod weeder, the combination with a main frame having an axle, of wheels mounted in said axle and rotating said axle in said frame, a plurality of beams pivotally mounted in said frame, means for connecting said beams, one of said beams being formed hollow with an open lower side, a weeder rod carried by the lower ends of said beams and means disposed within said hollow beam for rotating said rod from said axle.

8. In a rotary rod weeder, a plurality of shoes for supporting the weeder rod, each shoe being provided with a sectional bearing, and means for locking the sections of said bearing together, held in locked position by the insertion of said weeder rod.

9. In a rotary rod weeder, the combination with a substantially V-shaped frame, of an axle mounted in said frame, wheels mounted on said axle having a driving connection therewith, a shaft mounted in said frame driven from said axle, a plurality of beams pivotally mounted in said frame in transverse alignment with said driven shaft, shoes carried by the lower ends of said beams, sectional ground bearings detachably mounted in said shoes, one section of each bearing being provided with means for locking said sections together, and a weeder rod mounted in said bearings and holding said locking means in locked position.

10. A rotary rod weeder comprising a frame of substantially V-shape having an axle journalled therein, wheels mounted on said axle for rotating said axle and supporting said frame, a draft bar connected to said frame, a series of beams pivotally mounted in said frame having shoes at their forward ends, one of said beams being hollow, a bar connecting said beams intermittent their ends, detachable ground bearings mounted in said shoes, a weeder rod disposed in said ground bearings, means disposed in said hollow beam for driving said weeder rod from said axle and means for raising and lowering the beams independent of said frame.

In testimony whereof I hereunto affix my signature.

BENJAMIN JEROME CONNOR.